United States Patent
Nagoh et al.

[19]

[11] Patent Number: 6,141,135
[45] Date of Patent: Oct. 31, 2000

[54] PHOTOCHROMIC COMPOSITION

[75] Inventors: Hironobu Nagoh; Junji Momoda; Yuichiro Kawabata, all of Tokuyama, Japan

[73] Assignee: Tokuyama Corporation, Yamaguchi-ken, Japan

[21] Appl. No.: 09/330,144

[22] Filed: Jun. 11, 1999

[30] Foreign Application Priority Data

Jun. 18, 1998 [JP] Japan .................................. 10-171838

[51] Int. Cl.$^7$ ...................................................... G02F 1/03
[52] U.S. Cl. ........................... 359/241; 359/245; 359/246
[58] Field of Search .................................. 359/241, 245, 359/246, 265

[56] References Cited

U.S. PATENT DOCUMENTS

| | | | |
|---|---|---|---|
| 4,994,208 | 2/1991 | Mcbain | 252/586 |
| 5,981,634 | 11/1999 | Smith | 524/87 |

FOREIGN PATENT DOCUMENTS

| | | |
|---|---|---|
| 0619358 | 10/1994 | European Pat. Off. . |
| 0696582 | 2/1996 | European Pat. Off. . |
| 0778276 | 6/1997 | European Pat. Off. . |
| 0875509 | 11/1998 | European Pat. Off. . |
| 0926146 | 9/1999 | European Pat. Off. . |
| 4325154 | 9/1994 | Germany . |

OTHER PUBLICATIONS

Patent Abstracts of Japan, vol., 015, No. 317, Aug. 13, 1991 & JP 03 121188A (Tokuyama Soda Co., Ltd.) May 23, 1991 (Abstract).

*Primary Examiner*—Scott J. Sugarman
*Assistant Examiner*—Michael A. Lucas

[57] ABSTRACT

A photochromic composition which develops a neutral tint such as grey, green, brown or amber upon the irradiation with light including ultraviolet rays such as sunlight starting from the initial colorless state, maintaining a homogeneous color tone in the transient stage of developing color. The photochromic composition comprises 100 parts by weight of a fulgimide compound and/or a fulgide compound, and from 10 to 300 parts by weight of a chromene compound having a molar extinction coefficient of not smaller than 150 L/mol-cm for light of a wavelength of 400 nm.

10 Claims, 1 Drawing Sheet

PHOTOCHROMIC COMPOSITION

BACKGROUND OF THE INVENTION

1. Field of the Invention

The present invention relates to a photochromic composition which develops a neutral tint such as grey, green, brown or amber upon the irradiation with light including ultraviolet rays such as sunlight starting from the initial colorless state, maintaining a homogeneous color tone in the transient stage of developing color.

2. Prior Art

Photochromism is a phenomenon which is drawing attention in these several years, and stands for a reversible action of a compound; i.e., a compound quickly changes its color when it is irradiated with light containing ultraviolet rays such as sunlight or light of a mercury lamp, and resumes its initial color when it is no longer irradiated with light and is placed in a dark place. The compound having such a property is called photochromic compound. The compounds having a variety of structures have heretofore been synthesized and proposed, but no particular common skeleton is recognized in their structures. As the photochromic compounds, there have been known fulgide compounds or fulgimide compounds (hereinafter, fulgimide compounds and fulgide compounds are referred to as fulgimide compounds), chromene compounds and spirooxazine compounds.

The fulgimide compounds, at the start of developing color, exhibit color tones of, generally, orange to blue, the chromene compounds develop orange to yellow color, and the spirooxazine compounds develop reddish violet to blue color.

It is generally desired that the photochromic lenses develop color of a tone of grey, green, amber or brown. When the above-mentioned compounds are used in a single kind, however, a desired neutral tint is not obtained in many cases. Neutral tints can be obtained by mixing chromene compounds, fulgimide compounds and spirooxazine compounds that develop colors of different tones at any composition ratio. For example, Japanese Unexamined Patent Publication (Kokai) No. 121188/1991 discloses how to obtain neutral tints by mixing a chromene compound and a fulgimide compound, and Japanese Unexamined Patent Publication (Kokai) No. 9469/1993 discloses how to obtain neutral tints by mixing a chromene compound and a spirooxazine compound. Furthermore, German Patent Laid-Open Specification DE4325154 discloses how to develop grey, amber, brown as well as various other neutral tints by mixing a spirooxazine compound, a chromene compound and a fulgimide compound together.

In developing a color of a photochromic lens by placing it outdoors or by the irradiation with sunlight, it is one of the important properties of the photochromic lens that a color of a homogeneous tone is obtained in a transient stage in which the photochromic lens develops a neutral tint such as grey or brown starting from the colorless state.

A photochromic lens intended to develop a neutral tint by mixing several kinds of the above-mentioned photochromic compounds develops a color of which the tone changes from the colorless state to blue, to grey or brown when it is observed outdoors with the passage of time, and fails to develop a color of a homogeneous tone in the transient stage of developing color. The reason is because various photochromic compounds in the mixture composition exhibit different sensitivities for the sunlight. The fulgimide compounds or the spirooxazine compounds used in the above-mentioned known art exhibit good sensitivity for the sunlight compared to the chromene compounds. Therefore, they exhibit color starting from blue and finally exhibit a neutral tint of grey or brown. When it is attempted to obtain a neutral tint using photochromic compounds of different kinds such as chromene compounds and fulgimide compounds as described above, there arouses a problem in that the color tone lacks homogeneity in the transient stage of developing color.

When the above-mentioned chromene compound, fulgimide compound or spirooxazine compound is used alone, there is no problem concerning the homogeneity of color tone in the transient stage for developing color but a desired color tone is not obtained in many cases. When the compound is used as a photochromic lens, in particular, a color tone such as grey, green, amber or brown is preferred. Such a color tone, however, is not obtained by using the above-mentioned compound in a single kind.

SUMMARY OF THE INVENTION

The present inventors therefore have conducted keen study to obtain a photochromic lens that develops a neutral tint such as grey, green, amber or brown by using photochromic compounds of different kinds such as chromene compounds and fulgimide compounds, giving attention to improving the homogeneity in the transient stage of developing color.

As a result, the present inventors have discovered the fact that the combinations of fulgimide compounds with particular chromene compounds having sensitivity to sunlight similar to that of the fulgimide compounds, exhibit grey, green, amber, brown as well as various neutral tints maintaining homogeneity in the color in the transient stage of developing color, and have completed the present invention.

The present invention is concerned with a photochromic composition comprising 100 parts by weight of a fulgimide compound and/or a fulgide compound, and from 10 to 300 parts by weight of a chromene compound having a molar extinction coefficient of not smaller than 150 L/mol-cm for light of a wavelength of 400 nm. The invention is further concerned with a photochromic polymerizable composition containing the above-mentioned photochromic composition, and a photochromic cured product obtained by polymerizing the photochromic polymerizable composition.

It is desired that:

(1) the above-mentioned photochromic composition further contains a spirooxazine compound, and/or a chromene compound having a molar extinction coefficient of smaller than 150 L/mol-cm for light of a wavelength of 400

(2) the photochromic composition further contains an ultraviolet ray-absorbing agent, and (3) the fulgimide compound and/or the fulgide compound has a molar extinction coefficient of not smaller than 100 L/mol-cm for light of a wavelength of 380 nm.

It is further desired that the photochromic polymerizable composition contains the above-mentioned photochromic composition in an amount of from 0.001 to 1 part by weight and a radically polymerizable monomer in an amount of 100 parts by weight. More desirably, the radical polymerizable monomer contains a (meth)acrylate polymerizable monomer in an amount of from 70 to 100% by weight.

DETAILED DESCRIPTION OF THE INVENTION

[Fulgimide Compound (and/or Fulgide Compound)]

Figure 1:
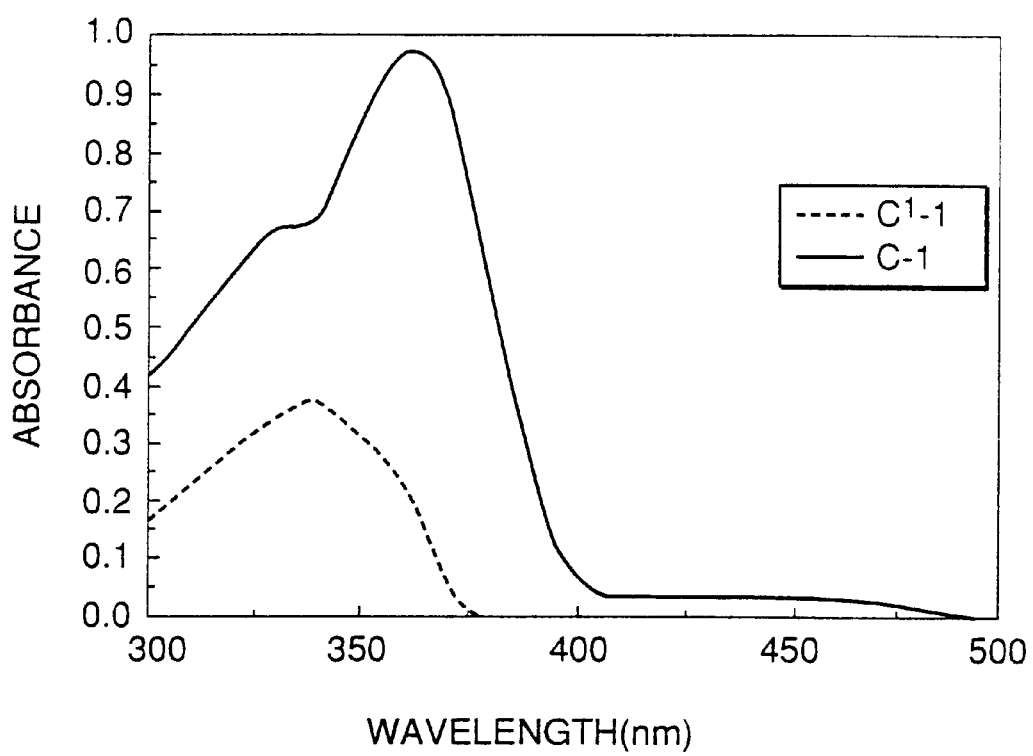
FIG. 1 is a diagram of ultraviolet—visible spectra of chromene compounds C-1 and C'-1.

The fulgimide compound in the present invention has a fulgide skeleton or a fulgimide skeleton, and a known compound having photochromic property can be used without any limitation. For example, a fulgimide compound represented by the following general formula (3) can be preferably used,

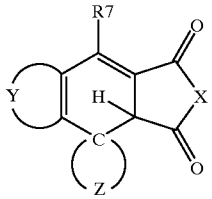

(3)

wherein

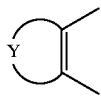

is a divalent aromatic hydrocarbon group or a divalent unsaturated heterocyclic group which may have a substituent, respectively, R7 is an alkyl group, a cycloalkyl group, an aromatic hydrocarbon group or a monovalent heterocyclic group,

is a norbornylidene group, a bicyclononylidene group or an adamantylidene group, X is an oxygen atom, a group >N-R8, a group >N-A1-B1-(A2)p-(B2)q-R9, a group >N-A3-A4, a group >N-A3-R10, or a group

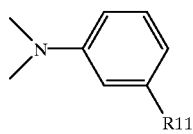

wherein R8 is a hydrogen atom, an alkyl group, an aromatic hydrocarbon group or a cyano group, A1, A2 and A3 may be the same or different and are alkylene groups, alkylidene groups, cycloalkylene groups or alkylcycloalkane-diil groups, B1 and B2 may be the same or different and are

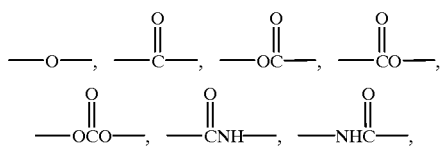

p and q are 0 or 1 independently of each other and q is 0 when p is 0, R9 is an alkyl group, a naphthyl group or a naphthylalkyl group, A4 is a naphthyl group, R10 is a halogen atom, a cyano group or a nitro group, and R11 is a halogen atom, a perhalogenoalkyl group, or a cyano group. As the divalent aromatic hydrocarbon group represented by

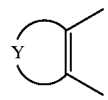

in the above-mentioned general formula (3), there can be exemplified divalent groups derived from a benzene ring or from a condensed ring of 2 to 3 benzene rings. As the divalent unsaturated heterocyclic group, there can be exemplified divalent groups derived from 5- to 7-membered rings containing 1 or 2 nitrogen atoms, oxygen atoms or sulfur atoms as ring-constituting atoms or derived from a condensed ring of the 5- to 7-membered rings and a benzene ring or a cyclohexane ring. Concrete examples of the divalent aromatic hydrocarbon group include those groups having 6 to 14 carbon atoms derived from benzene ring, naphthalene ring, phenanthrene ring and anthracene ring. Concrete examples of the divalent unsaturated heterocyclic group include those groups having 4 to 9 carbon atoms derived from pyridine ring, quinoline ring, isoquinoline ring, pyrole ring, indole ring, furan ring, benzofuran ring, tetrahydrobenzofuran ring, thiophene ring, benzothiophene ring and tetrahydrobenzothiophene ring. Though there is no particular limitation on the substituents of these groups, there can be used a halogen atom such as chlorine atom, bromine atom or iodine atom; an alkyl group having 1 to 20 carbon atoms, such as methyl group, ethyl group, isopropyl group, t-butyl group or octadecyl group; an alkoxyl group having 1 to 20 carbon atoms such as methoxyl group, ethoxyl group, t-butoxyl group or octadecyloxyl group; an aromatic hydrocarbon group having 6 to 10 carbon atoms, such as phenyl group, tolyl group, or xylyl group; an alkoxyaryl group having 7 to 14 carbon atoms (aromatic hydrocarbon group having 6 to 10 carbon atoms substituted with an alkoxyl group having 1 to 4 carbon atoms), such as 4-methoxyphenyl group, 4-ethoxyphenyl group, 4-methoxynaphthyl group or 4-ethoxynaphthyl group; an amino group; a nitro group; and a cyano group.

In the above-mentioned general formula (3), examples of the alkyl group, aromatic hydrocarbon group and heterocyclic group represented by R7 include alkyl groups having 1 to 4 carbon atoms, such as methyl group, ethyl group, isopropyl group and n-butyl group; aromatic hydrocarbon groups having 6 to 10 carbon atoms such as phenyl group and naphthyl group; and monovalent heterocyclic groups derived from 5- to 7-membered rings containing 1 or 2 oxygen atoms, nitrogen atoms or sulfur atoms or derived from a condensed ring the 5- to 7-membered rings and a benzene ring or a cyclohexane ring, such as furyl group, thienyl group and benzothienyl group. As the cycloalkyl group, there can be exemplified those having 3 to 8 carbon atoms, such as cyclopropyl group, cyclobutyl group, cyclopentyl group and cyclohexyl group. Though there is no particular limitation on the substituents on these groups, there can be used those groups same as the above-mentioned substituents.

In the above-mentioned general formula (3), the alkyl group and aromatic hydrocarbon group represented by R8 of when X is a group containing a nitrogen atom, are the same as the alkyl group and aromatic hydrocarbon group represented by R7. It is desired that the alkylene group represented by A1, A2 and A3 is the one having 1 to 4 carbon atoms, such as methylene group, ethylene group, propylene group, trimethylene group or tetramethylene group, that the alkylidene group is one having 2 to 4 carbon atoms, such as ethylidene group, propylidene group or isopropylidene group, that the cycloalkylene group is a cyclohexylene, and that the alkylcycloalkane-diil group is a dimethylcyclohexane-diil group. The alkyl group represented by R9 is the same as the one represented by R7, and the naphthylalkyl group is desirably the one having 11 to 14 carbon atoms, such as naphthylmethyl group, naphthylethyl group, naphthylpropyl group or naphthylbutyl group. It is further desired that the halogen atom represented by R11 is a fluorine atom, and the perhalogenoalkyl group is the one having 1 to 4 carbon atoms, such as trifluoromethyl group, pentafluoroethyl group, heptafluoropropyl group or nonafluorobutyl group.

Among the fulgimide compounds represented by the above-mentioned general formula (3), in view of the durability of the photochromic property, it is desired to use these compounds in which R7 is an alkyl group or a cycloalkyl group, X is >N—R wherein R is a cyanoalkyl group having an alkyl group containing 1 to 4 carbon atoms, a cyano group, a nitroalkyl group having 1 to 4 carbon atoms, or an alkoxycarbonylalkyl group having 3 to 9 carbon atoms (containing an alkoxyl group having 1 to 4 carbon atoms and an alkylene group having 1 to 4 carbon atoms), or is

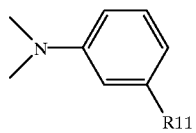

wherein R11 is a cyano group,

is an adamantylidene group, and

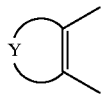

is an aromatic hydrocarbon group having 6 to 10 carbon atoms, or a heterocyclic group which may be substituted by an alkoxyaryl group having 7 to 14 carbon atoms (aromatic hydrocarbon having 6 to 10 carbon atoms substituted by an alkoxyl group having 1 to 4 carbon atoms) and, particularly, a group derived from a furan ring or a thiophene ring.

Concrete examples of the fulgimide compounds that can be favorably used in the present invention are as described below.
1) N-Cyanomethyl-6,7-dihydro-4-methyl-2-phenylspiro(5,6-benzo[b]thiophenedicarboxyimide-7,2-tricyclo[3.3.1.1³,⁷]decane);
2) N-Cyanomethyl-6,7-dihydro-2-(4'-methoxyphenyl)-4-methylspiro(5,6-benzo[b]thiophenedicarboxyimide-7,2-tricyclo[3.3.1. 1³,⁷]decane);
3) N-Cyano-6,7-dihydro-4-methyl-2-phenylspiro(5,6-benzo[b]thiophenedicarboxyimide-7,2-tricyclo[3.3.1.1³,⁷]decane);
4) N-Cyano-6,7-dihydro-4-methylspiro(5,6-benzo[b]furandicarboxyimide-7,2-tricyclo[3.3.1.1³,⁷]decane);
5) N-Cyano-4-cyclopropyl-6,7-dihydrospiro(5,6-benzo[b]furandicarboxyimide-7,2-tricyclo[3.3.1.1³,⁷]decane);
6) N-Cyano-6,7-dihydro-4-methylspiro(5,6-benzo[b]thiophenedicarboxyimide-7,2-tricyclo[3.3.1. 1³,⁷]decane);
7) N-Cyanomethyl-4-cyclopropyl-6,7-dihydrospiro(5,6-benzo[b]thiophenedicarboxyimide-7,2-tricyclo[3,3,1,1³,⁷]decane);
8) N-Cyanomethyl-4-cyclopropyl-6,7-dihydro-2-(4,-methoxyphenyl)spiro(5,6-benzo[b]thiophenedicarboxyimide-7,2-tricyclo[3,3,1,1³,⁷]decane);
9) N-Cyanomethyl-4-cyclopropyl-6,7-dihydro-2-phenylspiro(5,6-benzo[b]thiophenedicarboxyimide-7,2-tricyclo[3,3,1,1³,⁷]decane); and
10) N-(3'-Cyanophenyl)-6,7-dihydro-4-methyl-2-(4'-methoxyphenyl)spirobenzothiophenecarboxyimide-7,2'-tricyclo[3,3,1,1³,⁷]decane).

In the present invention, the above-mentioned fulgimide compounds can be used in one kind or being mixed together in two or more kinds depending upon the applications.

In the photochromic composition of the present invention, it is particularly desired to use a fulgimide compound having a molar extinction coefficient of not smaller than 100 L/mol-cm for light of a wavelength of 380 nm from the standpoint of obtaining a neutral tint of a favorable color tone and obtaining a homogeneous color tone in the transient stage of developing color.

Here, the molar extinction coefficient (unit in L/mol-cm) is a number expressing a degree of absorption of light having a particular wavelength by a mol of a given substance. This number is derived in compliance with the Lambert-Beer's law, and satisfies the following relationship, $$I = I_0 \times 10^{-\epsilon bc}$$

wherein $I_0$ is an absorption intensity at a predetermined wavelength of when a control solution is placed in the optical path, I is an absorption intensity at a predetermined wavelength of when a sample solution is placed in the optical path, $\epsilon$ is a molar extinction coefficient, b is a thickness of the sample solution, and c is a mol number (mol/L) of a sample substance per a liter of the sample solution.

In the present invention, the absorption intensity is measured respectively by introducing the control solution or the sample solution (concentration of C mol/L) into a cell having an optical path length of 1 cm to find the absorbance A ($=\log_{10}(I_0/I)$), and the molar extinction coefficient $\epsilon$ is found from the following formula derived from the above-mentioned relation, $$\epsilon(L/\text{mol} - \text{cm}) = \frac{\log_{10}(I_0/I)}{bc} = \frac{A}{1[\text{cm}] \cdot C[\text{mol}/L]}$$

That is, the larger the value $\epsilon$, the larger the degree of light absorption by a molecule of the substance at a particular wavelength.

[Chromene Compounds]

(i) Chromene compounds having molar extinction coefficients at a wavelength of 400 nm of not smaller than 150 L/mol-cm (chromene 1).

The photochromic composition of the present invention must contain a chromene compound having a molar extinction coefficient at a wavelength of 400 nm of not smaller than 150 L/mon-cm in a predetermined amount. As the chromene compound, there can be used, without any limitation, a known photochromic chromene compound having a chromene skeleton and satisfying the above-mentioned molar extinction coefficient. The photochromic composition without at all using the above particular chromene compound, i.e., using only chromene compounds having a molar extinction coefficient at 400 nm of smaller than 150 L/mol-cm, exhibits different color-developing sensitivities inherent in the fulgimide compound and the chromene compound, and fails to exhibit homogeneity in the color in the transient stage of developing color.

Among the above-mentioned chromene compounds (i), it is particularly desired to use a chromene compound expressed by the following general formula (1),

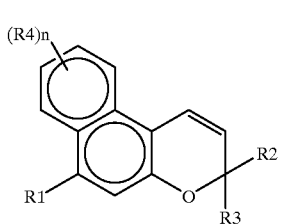

(1)

wherein R1 is a group represented by the following formula (2),

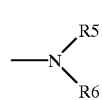

(2)

wherein R5 and R6 may be different from each other and are hydrogen atoms, substituted or unsubstituted alkyl groups having 1 to 10 carbon atoms, substituted or unsubstituted aromatic hydrocarbon groups having 6 to 10 carbon atoms, or heterocyclic groups, a substituted or unsubstituted heterocyclic group having at least nitrogen atom as a hetero atom, the nitrogen atom being bonded to a naphthopyran ring, or a condensed heterocyclic group in which the heterocyclic group is condensed with an aromatic hydrocarbon ring or an aromatic heterocyclic ring, R2 and R3 may be different from each other and are substituted or unsubstituted aromatic hydrocarbon groups, or substituted or unsubstituted aromatic heterocyclic groups or alkyl groups, R4 is a substituent, n is an integer of from 0 to 4 representing the number of R4, and, when n is not smaller than 2, R4 may be the same or different from groups, from the standpoint of improving homogeneity in the color in the transient stage of developing color of the photochromic composition of the present invention.

The chromene compounds that can be favorably used for the photochromic composition of the present invention are expressed by the above-mentioned general formula (1) and have a distinguished feature in that they have, at the 6-th position of the benzochromene ring, a group represented by the above-mentioned formula (2), a substituted or unsubstituted heterocyclic group containing a nitrogen atom as a hetero atom, the nitrogen atom being bonded to the naphthpyran ring, or a condensed heterocyclic group in which the heterocyclic group is condensed with an aromatic hydrocarbon ring or an aromatic heterocyclic ring. These compounds exhibit ultraviolet ray absorption spectra of up to near 400 nm similar to those of the above-mentioned fulgimide compounds. It is, therefore, presumed that when a color is developed by sunlight, these properties enable the chromene compound of yellow to orange color to exhibit a color-developing sensitivity nearly the same as the color-developing sensitivity of a fulgimide compound of blue color, making it possible to obtain a composition which exhibits a high degree of homogeneity in the color in the transient stage of developing color.

In the above-mentioned general formula (1), R1 is a group represented by the above-mentioned formula (2), a substituted or unsubstituted heterocyclic group having nitrogen atom as a hetero atom, the nitrogen atom being bonded to the naphthopyran ring, or a condensed heterocyclic group in which the heterocyclic group is condensed with an aromatic hydrocarbon ring or an aromatic heterocyclic ring.

In the substituents R5 and R6 in the above-mentioned formula (2), a known group can be used without any limitation as the substituted or unsubstituted alkyl group having 1 to 10 carbon atoms, as the substituted or unsubstituted aromatic hydrocarbon group having 6 to 10 carbon atoms, or as the heterocyclic group, in addition to the hydrogen atom. As the alkyl group, aromatic hydrocarbon group or the heterocyclic group, there can be favorably used alkyl groups having 1 to 4 carbon atoms, such as methyl group, ethyl group, isopropyl group and n-butyl group; aromatic hydrocarbon groups such as benzene ring and naphthalene ring; and heterocyclic groups such as furyl group, thienyl group and benzothienyl group. The substituents R5 and R6 may be the same or different.

As a substituent for these alkyl groups, aromatic hydrocarbon groups or heterocyclic rings, there can be used a halogen atom such as chlorine atom, bromine atom or iodine atom, or a hydroxyl group or a cyano group.

Concrete examples of the group represented by the above-mentioned formula (2) include amino group, methylamino group, ethylamino group, propylamino group, isopropylamino group, dimethylamino group, diethylamino group, dipropylamino group, methylethylamino group, 2-hydroxyethylamino group, di(hydroxyethyl)amino group, di(cyanomethyl)amino group and diphenylamino group.

In the substituted or unsubstituted heterocyclic group having a nitrogen atom as a hetero atom, the nitrogen atom being bonded to the naphthopyran ring or in the condensed heterocyclic group in which the heterocyclic group is condensed with an aromatic hydrocarbon ring or an aromatic heterocyclic ring, represented by R1 in the general formula (1), it is desired that the number of carbon atoms constituting the heterocyclic group is from 2 to 10 and, preferably, from 2 to 6. The ring may further include a hetero atom in addition to the nitrogen atom bonded to the naphthopyran ring. Though there is no particular limitation, the hetero atom is preferably an oxygen atom, a sulfur atom or a nitrogen atom. As the aromatic hydrocarbon ring bonded to the heterocyclic group, or the aromatic heterocyclic ring, there can be exemplified an aromatic hydrocarbon ring having 6 to 10 carbon atoms and an aromatic heterocyclic ring. Suitable examples include a benzene ring, a thiophene ring and a furan ring. In the heterocyclic group, at least one hydrogen atom may be substituted. As the substituent, there can be used any known substituent irrespective of its kind and, preferably, an alkyl group, an aromatic hydrocarbon group and a halogen atom.

There is no particular limitation on the alkyl group which is a substituent in the group R1 (the substituted or unsubstituted heterocyclic group, the condensed heterocyclic group). Generally, however, the alkyl group has from 1 to 10 carbon atoms and, preferably, from 1 to 4 carbon atoms. Concrete examples of the alkyl group include methyl group, ethyl group, n-propyl group, isopropyl group, n-butyl group and t-butyl group.

Though there is no particular limitation, the aromatic hydrocarbon group usually has from 6 to 14 carbon atoms and, preferably, from 6 to 10 carbon atoms. Concrete examples of the aromatic hydrocarbon group include phenyl group, tolyl group, xylyl group and naphthyl group.

Though there is no particular limitation, the halogen atom is usually a fluorine atom, a chlorine atom, a bromine atom or a iodine atom and, preferably, the fluorine atom, the chlorine atom or the bromine atom.

As the substituted or unsubstituted heterocyclic group or the condensed heterocyclic group represented by R1, there can be exemplified pyrrolydinyl group, piperidino group, hexamethyleneimino group, 2,2,6,6-tetramethylpiperidino group, morpholino group, 2,6-dimethylmorpholino group, piperazinyl group, N-methylpiperazinyl group, thiomorpholino group, indolyl group, methylindolyl group, tetrahydroquinolyl group and aziridinyl group.

In the above-mentioned general formula (1), R2 and R3 may be different from each other, and are substituted or unsubstituted aromatic hydrocarbon groups, substituted or unsubstituted aromatic heterocyclic groups, or alkyl groups. Though there is no particular limitation, the aromatic hydrocarbon groups R2 and R3 usually have from 6 to 10 carbon atoms. Concrete examples of the aromatic hydrocarbon group include phenyl group, 2-naphthyl group and 1-naphthyl group.

Though there is no particular limitation, the aromatic heterocyclic groups R2 and R3 usually have from 3 to 20 carbon atoms and, preferably, from 3 to 12 carbon atoms. Though there is no particular limitation, the hetero atoms included in the aromatic heterocyclic group are oxygen atoms, sulfur atoms or nitrogen atoms, and their number are from 1 to 3 and, preferably, from 1 to 2. When the hetero atoms are included in a plural number in the aromatic heterocyclic group, the hetero atoms may be of the same kind or different kinds. The aromatic heterocyclic group may be further condensed and cyclized with an aromatic ring. The aromatic ring for condensation and cyclization has from 6 to 10 carbon atoms, and its examples include a benzene ring and a naphthalene ring. Concrete examples of the aromatic heterocyclic group include furyl group, thienyl group, pyrrolyl group, benzofuryl group, benzothienyl group, indole group, quinolyl group, isoquinolyl group, dibenzofuryl group and carbazole group.

Though there is no particular limitation, the alkyl group usually has from 1 to 5 carbon atoms and, preferably, from 1 to 3 carbon atoms, and its examples include methyl group, ethyl group, n-propyl group and isopropyl group. If practical durability is taken into consideration, the methyl group is most preferred.

The aromatic hydrocarbon groups or the aromatic heterocyclic groups represented by R2 and R3 may have a known substituent. Though there is no particular limitation on the kind thereof, preferred examples of the substituent include alkyl group, alkoxyl group, alkoxyalkoxyl group, aryloxyl group, alkoxylalkyl group, aralkyl group, substituted amino group, substituted or unsubstituted heterocyclic group having a nitrogen atom as a hetero atom, the nitrogen atom being bonded to the aromatic hydrocarbon group or to the aromatic heterocyclic group, acyloxyl group, hydroxyl group, acyl group, alkoxycarbonyl group, aryloxycarbonyl group, halogen atom, cyano group, trifluoromethyl group, trifluoromethoxyl group and nitro group. There is no particular limitation on the positions where the substituents are bonded to the aromatic hydrocarbon group or to the aromatic heterocyclic group and on the number of the substituents. Preferably, however, the number of the substituent groups is from 0 to 4 and, more preferably, from 0 to 3. The substituents of the same kind may be used or the substituents of different kinds may be used in any combination.

Though there is no particular limitation, the alkyl group which is a substituent for the aromatic hydrocarbon groups or the aromatic heterocyclic groups represented by R2 and R3, usually has from 1 to 10 carbon atoms and, preferably, from 1 to 4 carbon atoms. Concrete examples of the alkyl group include methyl group, ethyl group, n-propyl group, isopropyl group, n-butyl group and t-butyl group.

Though there is no particular limitation, the alkoxyl group usually has from 1 to 10 carbon atoms and, preferably, from 1 to 4 carbon atoms. Concrete examples of the alkoxyl group include methoxyl group, ethoxyl group, n-propoxyl group, isopropoxyl group, n-butoxyl group and t-butoxyl group.

Though there is no particular limitation, the alkoxyalkoxyl group usually has from 2 to 20 carbon atoms and, preferably, from 3 to 10 carbon atoms. Concrete examples of the alkoxyalkoxyl group include methoxyethoxyl group, ethoxyethoxyl group, methoxypropoxyl group and methoxybutoxyl group.

Though there is no particular limitation, the aryloxyl group usually has from 6 to 14 carbon atoms and, preferably, from 6 to 10 carbon atoms. Concrete examples of the aryloxyl group include phenoxy group, 1-naphthoxy group and 2-naphthoxy group.

Though there is no particular limitation, the alkoxyalkyl group usually has from 2 to 10 carbon atoms and, preferably, from 2 to 6 carbon atoms. Concrete examples of the alkoxyalkyl group include methoxymethyl group, ethoxymethyl group, propoxymethyl group, dimethoxymethyl group, 2,2-dioxacyclopentane-1-il group and butoxymethyl group.

Though there is no particular limitation, the aralkyl group usually has from 7 to 16 carbon atoms and, preferably, from 7 to 10 carbon atoms. Concrete examples of the aralkyl group include benzyl group, phenylethyl group, phenylpropyl group and phenylbutyl group.

Though there is no particular limitation, the acyloxyl group usually has from 1 to 15 carbon atoms and, preferably, from 1 to 6 carbon atoms. Concrete examples of the acyloxyl group include acetoxyl group, propionyloxyl group, butyryloxyl group, (meth)acryloyloxyl group and benzoyloxyl group.

Though there is no particular limitation, the substituted amino group is usually an amino group having a substituent such as an alkyl group having 1 to 10 carbon atoms or a hydroxyl-substituted alkyl group. Concrete examples of the substituted amino group include methylamino group, ethylamino group, propylamino group, isopropylamino group, dimethylamino group, diethylamino group, dipropylamino group, methylethylamino group, 2-hydroxyethylamino group and di(hydroxyethyl)amino group.

In the substituted or unsubstituted heterocyclic group having a nitrogen atom as a hetero atom, the nitrogen atom being bonded to the aromatic hydrocarbon group or to the aromatic heterocyclic group, it is desired that the number of carbon atoms constituting the heterocyclic group is from 2 to 10 and, preferably, from 2 to 6. The ring may contain hetero atoms in addition to the nitrogen atom bonded to the aromatic hydrocarbon group or to the aromatic heterocyclic group. Though there is no particular limitation, the hetero atom is an oxygen atom, a sulfur atom or a nitrogen atom.

Concrete examples of the substituted or unsubstituted heterocyclic group having the nitrogen atom as a hetero atom and is bonded to the aromatic hydrocarbon group or to the aromatic heterocyclic group through the nitrogen atom, include pyrrolydinyl group, piperidino group, hexamethyleneimino group, 2,2,6,6-tetramethylpiperidino group, morpholino group, 2,6-dimethylmorpholino group, N-methylpiperadinyl group and thiomorpholino group.

Though there is no particular limitation, the alkoxycarbonyl group usually has from 1 to 10 carbon atoms and, preferably, from 1 to 7 carbon atoms. Concrete examples of the alkoxycarbonyl group include methoxycarbonyl group, ethoxycarbonyl group, (iso)propoxycarbonyl group, and (iso, t-)butyloxycarbonyl group.

Though there is no particular limitation, the aryloxycarbonyl group usually has from 6 to 20 carbon atoms and, preferably, from 6 to 10 carbon atoms. Concrete examples of the aryloxycarbonyl group include phenyloxycarbonyl group, 1-naphthyloxycarbonyl group, and 2-naphthyloxycarbonyl group.

Though there is no particular limitation, the acyl group usually has from 1 to 15 carbon atoms and, preferably, from 1 to 7 carbon atoms. Concrete examples of the acyl group include formyl group, acetyl group, propionyl group, butylyl group and benzoyl group.

Though there is no particular limitation, the halogen atom is usually a fluorine atom, a chlorine atom, a bromine atom or an iodine atom.

In the above-mentioned general formula (1), R4 denotes a substituent on the 5-th position, 7-th position, 8-th position, 9-th position or 10-th position of the naphthopyrane ring. Introduction of the substituent does not seriously affect the effect of the present invention. Examples of the substituent include alkyl group, alkoxyl group, aralkyl group, acyl group, alkoxycarbonyl group, substituted amino group, substituted or unsubsituted heterocyclic group having a nitrogen atom as a hetero atom, the nitrogen atom being bonded to the naphthopyrane ring, aromatic hydrocarbon group, acyloxyl group, nitro group, hydroxyl group and halogen atom. Though there is no particular limitation, the aromatic hydrocarbon group usually has from 6 to 14 carbon atoms. Preferred examples of the aromatic hydrocarbon group include phenyl group, tolyl group, xylyl group and naphthyl group. Other substituents will be those same as the groups or atoms described above already in connection with the substituents that may be possessed by the substituted or unsubstituted aromatic hyrocarbon group and the aromatic heterocyclic group represented by R2 and R3.

Symbol n represents the number of the substituents R4, and is an integer of from 0 to 4. From the standpoint of synthesis, however, it is desired that n is not larger than 3 and, more preferably, not larger than 2.

As the chromene compound (i) used for the present invention, the one represented by the following formula (1') is preferably used for further improving homogeneity in the color in the transient stage of developing color.

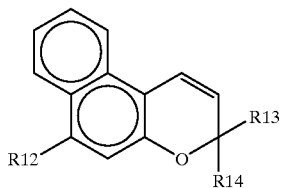

wherein R12 is a group represented by the following formula (2'),

wherein R15 an R16 may be different from each other and are substituted or unsubstituted alkyl groups having from 1 to 10 carbon atoms,
or is a substituted or unsubstituted group selected from the group consisting of pyrrolydinyl group, morpholino group, piperidino group, thiomorpholino group, aziridinyl group, piperadinyl group, hexamethyleneimino group, indolyl group and tetrahydroquinolyl group, and R13 and R14 may be different from each other and are methyl groups or substituted or unsubstituted groups selected from the group consisting of phenyl group, naphthyl group, furyl group, thienyl group, pyrrolyl group, benzofuryl group and benzothienyl group.

Concrete examples of the preferred chromene compound (i) that can be used for the photochromic composition of the present invention include:
1) 6-Morpholino-3,3-bis(3-fluoro-4-methoxyphenyl)-3H-benzo(f)chromene;
2) 6-Morpholino-3-(4-methoxyphenyl)-3-(4-trifluoromethoxyphenyl)-3H-benzo(f)chromene;
3) 6-Piperidino-3-methyl-3-(2-naphthyl)-3H-benzo(f) chromene;
4) 6-Piperidino-3-methyl-3-phenyl-3H-benzo(f)chromene;
5) 6-Morpholino-3,3-bis(4-methoxyphenyl)-3H-benzo(f) chromene;
6) 6-Hexamethyleneimino-3-methyl-3-(4-methoxyphenyl)-3H-benzo(f)chromene;
7) 6-Morpholino-3-(2-furyl)-3-methyl-3H-benzo(f) chromene;
8) 6-Morpholino-3-(2-thienyl)-3-methyl-3H-benzo(f) chromene; and
9) 6-Morpholino-3-(2-benzofuryl)-3-methyl-3H-benzo(f) chromene.

In the present invention, the chromene compounds can be used in a single kind or in two or more kinds being mixed together depending upon the applications.

In the photochromic composition of the present invention, the amounts of adding the compounds cannot be exclusively determined since the color density differs depending upon the compounds. Generally, however, the chromene compound having a molar extinction coefficient for light of a wavelength of 400 nm of not smaller than 150 L/mol-cm is contained in an amount of from 10 to 300 parts by weight per 100 parts by weight of the fulgimide compound to obtain a photochromic composition that exhibits homogeneous color in the transient stage of developing color. When the amount of addition of the chromene compound of the invention is smaller than 10 parts by weight per 100 parts by weight of the fulgimide compound, a sufficient degree of homogeneity in the color is not obtained in the transient stage of developing color, and a neutral tint is not in many cases obtained. Similarly, when the amount of addition is larger than 300 parts by weight, a sufficient degree of homogeneity in the color is not obtained in the transient stage of developing color, and a neutral tint is not in may cases obtained.

By taking the adjustment of color tone and durability into consideration, furthermore, it is also allowable to add a known photochromic compound such as a spirooxazine compound or a chromene compound exhibiting a molar extinction coefficient for light of a wavelength of 400 nm of smaller than 150 L/mol-cm (these compounds will be described later) in addition to the above-mentioned two kinds of compounds. When a neutral tint is to be obtained by adding photochromic compounds other than the two kinds of compounds (the chromene compound and the fulgimide compound) used in the present invention, these compounds are added by taking their sensitivities into consideration so as to obtain a desired homogeneity in the color in the transient stage of developing color. In general, the fulgimide compound and the spirooxazine compound exhibit color-developing sensitivities which are nearly equal to each other. However, the chromene compound having a molar extinction coefficient of smaller than 150 L/mol-cm for light of a wavelength of 400 nm exhibits a color-developing sensitivity inferior to that of the fulgimide compound, and attention must be given concerning the amount of its addition to maintain homogeneity in the color in the transient stage of developing color. (ii) Chromene compounds having molar extinction coefficients at a wavelength of 400 nm of smaller than 150 L/mol-cm (chromene 2).

As the chromene compound (ii) having a molar extinction coefficient of smaller than 150 L/mol-cm for light of a wavelength of 400 nm, there can be used any compound having a chromene skeleton and photochromic property. For example, there can be favorably used a chromene compound represented by the following general formula (4), (4)

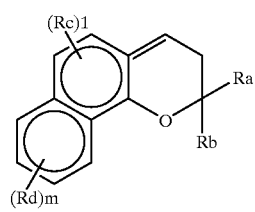

wherein Ra and Rb may be the same or different and are substituted or unsubstituted aromatic hydrocarbon groups, substituted or unsubstituted aromatic heterocyclic groups, or alkyl groups, or Ra and Rb may be coupled together to form a substituted or unsubstituted adamantane ring, substituted or unsubstituted bicyclononane ring or an unsubstituted norbornane ring, Rc and Rd are substituents, 1 and m are the numbers of the substituents Rc and Rd, 1 being an integer of from 0 to 2, and when 1 is 2, Rc may be the same or different substitutes, and m being an integer of from 0 to 4 and when m is not smaller than 2, Rd may be the same or different substituents.

In the above-mentioned general formula (4), the aromatic hydrocarbon groups, aromatic heterocyclic groups or alkyl groups denoted by Ra and Rb may be the same substituents as those denoted by R2 and R3 in the above-mentioned general formula (1). Furthermore, the substituents Rc and Rd may be the same as the substituents denoted by R4 in the above-mentioned general formula (1).

Concrete examples of the chromene compound exhibiting a molar extinction coefficient of smaller than 150 L/mol-cm for light of a wavelength of 400 nm include:
1) Spiro(bicyclo[3,3,1]nonane-9,2'-2H-benzo[h]chromene);
2) 7'-Methoxyspiro(bicyclo[3,3,1]nonane-9,2'-2H-benzo[h]chromene);
3) Spiro(norbornane-2,2'-2H-benzo[h]chromene);
4) 5,6-Dimethyl-2,2'-bis(4-methoxyphenyl)-2H-benzo[h]chromene;
5) 5-Tert-butyl-2,2'-diphenyl-2H-benzo[h]chromene;
6) 5-Isopropyl-2,2'-diphenyl-2H-benzo[h]chromene;
7) 5-Methyl-2-methyl-2,-phenyl-2H-benzo[h]chromene; and
8) 5-Methyl-2-methyl-2'-(3-fluorophenyl)-2H-benzo[h]chromene.

When the chromene compound having a molar extinction coefficiet for light of wavelength of 400 nm of smaller than 150 L/mol-cm is added, the chromene compound can be used in one kind or in two or more kinds being mixed together depending upon the applications.

The chromene compound (ii) can be blended in the composition within a range in which the action and effect of the invention are not impaired. The blending amount cannot be exclusively determined since it differs depending upon the color-developing density of the compound. Generally, however, the blending amount is usually not larger than 500 parts by weight and, particularly, from 10 to 300 parts by weight per 100 parts by weight of the fulgimide compound.

[Spirooxazine Compounds]

The photochromic composition of the present invention can be blended with a spirooxazine compound in order to adjust the color tone or to impart durability.

As the spirooxazine compound, there can be used any known compound having a spirooxazine skeleton and photochromic property. For example, there can be favorably used a spirooxazine compound represented by the following formula,

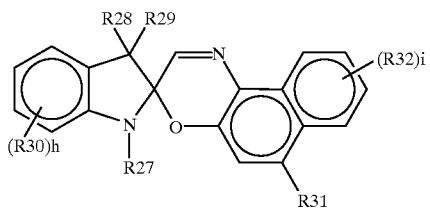

wherein R27 is an alkyl group which may be branched, R28 and R29 may be different from each other and are alkyl groups, or R28 and R29 may be coupled together to form a cycloalkane ring, R30 and R31 are alkyl groups, alkoxyl groups or halogen atoms, R32 is a hydrogen atom or a substituted or unsubstituted heterocyclic group having a nitrogen atom as a hetero atom, the nitrogen atom being bonded to a benzochromene ring, or a condensed heterocyclic group in which the heterocyclic group is condensed with an aromatic hydrocarbon ring or an aromatic heterocyclic ring, h is an integer of from 0 to 2 representing the number of the substituents R30, and i is an integer of from 0 to 2 representing the number of the substituents R32.

In the above-mentioned formula, there is no particular limitation on the alkyl groups denoted by R27, R28 and R29.

Examples include those alkyl groups having from 1 to 5 carbon atoms, such as methyl group, ethyl group, isopropyl group, n-propyl group, n-butyl group, isobutyl group and neopentyl groups. As the cycloalkane ring formed by the coupling of the groups R28 and R29, there can be exemplified a cyclopropane ring, a cyclobutane ring, a cyclopentane ring, a cyclohexane ring and a cycloheptane ring.

In the above-mentioned formula, there is no particular limitation on the alkoxyl groups denoted by R30 and R31. Examples include those alkoxyl groups having from 1 to 4 carbon atoms, such as methoxyl group, ethoxyl group, n-propoxyl group, n-butoxyl group, isobutoxyl group, and t-butoxyl group.

In the above-mentioned formulas, there is no particular limitation on the halogen atoms denoted by R30 and R31. Examples include fluorine atoms, chlorine atoms and bromine atoms.

In the above-mentioned formula, there is no particular limitation on the substituted or unsubstituted heterocyclic group denoted by R32 having a nitrogen atom as a hetero atom, the nitrogen atom being bonded to the benzochromene ring. Usually, however, there is used the one in which the number of carbon atoms constituting the heterocyclic group is from 2 to 10. The ring may further contain a hetero atom in addition to the nitrogen atom bonded to the benzochromene ring. Though there is no particular limitation, the hetero atom is preferably an oxygen atom, a sulfur atom or a nitrogen atom. As the aromatic hydrocarbon ring or the aromatic heterocyclic ring with which the heterocyclic group is condensed to form a condensed heterocyclic group, there can be exemplified those aromatic hydrocarbon rings and aromatic heterocyclic rings having from 6 to 10 carbon atoms, such as benzene ring, thiophene ring, furan ring and, particularly, benzene ring.

There can be used a known substituent without limitation as the substituent for the heterocyclic group having the nitrogen atom as a hetero atom and is bonded to the benzochromene ring through the nitrogen atom, or for the condensed heterocyclic group in which the heterocyclic group is condensed with an aromatic hydrocarbon ring or an aromatic heterocyclic ring. From the standpoint of easy synthesis, however, there are used alkyl groups having from 1 to 4 carbon atoms, such as methyl group, ethyl group, isopropyl group, n-propyl group and t-butyl group, alkoxyl groups such as methoxyl group, ethoxyl group, isopropoxyl group, n-propoxyl group and t-butoxyl group, or halogen atoms such as fluorine atoms, chlorine atoms or bromine atoms.

As the substituted or unsubstituted heterocyclic group having the nitrogen atom as a hetero atom and is bonded to the benzochromene ring through the nitrogen atom, or as the condensed heterocyclic group in which the heterocyclic group is condensed with an aromatic hydrocarbon ring or an aromatic heterocyclic ring, there can be exemplified pyrrolidinyl group, piperidino group, hexamethyleneimino group, 2,2,6,6-tetramethylpiperidino group, morpholino group, 2,6-dimethylmorpholino group, N-methylpiperadinyl group, thiomorpholino group, indolyl group, 2-methylindolyl group, tetrahyroquinolyl group and aziridinyl group.

Described below are concrete examples of the spirooxazine compound that can be favorably used in the present invention:

1) 1',5'-Dimethyl-6'-fluoro-6"-morpholinodispiro (cyclohexane-1,3'-(3H)indole-2'-(2H),3"-(3H)naphtho(3,2-a)(1,4)oxazine;
2) 6'-Fluoro-1'-methyl-8"-methoxy-6"-piperidinodispiro (cyclohexane-1,3'-(3H)indole-2'-(2H),3"-(3H)naphtho(3,2-a)(1,4)oxazine;
3) 6'-Fluoro-6"-morpholino-1'-neopentyldispiro (cyclohexane-1,3'-(3H)indole-2'-(2H),3"-( 3H)naphtho(3,2-a)(1,4)oxazine;
4) 5',7'-Difluoro-1'-methyl-6"-morpholinodispiro (cyclohexane-1,3'-(3H)indole-2'-(2H),3"-(3H)naphtho(3,2-a)(1,4)oxazine;
5) 6'-Fluoro-1'-(2-methyl)propyl-6"-morpholinodispiro (cyclohexane-1,3'-(3H)indole-2'-(2H),3"-(3H)naphtho(3,2-a)(1,4)oxazine;
6) 6"-Indolino-1',5'-dimethyl-6'-fluorodispiro(cyclohexane-1,3'-(3H)indole-2'-(2H),3"-(3H)naphtho(3,2-a)(1,4)oxazine; and
7) 6'-Methyl-6'-fluoro-1-(2-methyl)propyldispiro (cyclohexane-1,3'-(3H)indole-2'-(2H),3"-(3H)naphtho(3,2-a)(1,4)oxazine.

The above-mentioned spirooxazine compounds may be used in a single kind or in two or more kinds being mixed together at any ratio.

The above-mentioned spirooxazine compounds can be blended in the composition in a range in which the action and effect of the invention are not impaired. The blending amount cannot be exclusively determined since it differs depending upon the color-developing density of the compound. Generally, however, the blending amount is usually not larger than 300 parts by weight and, particularly, from 10 to 200 parts by weight per 100 parts by weight of the fulgimide compound.

[Ultraviolet Ray Absorbing Agents]

Addition of an ultraviolet ray absorbing agent to the photochromic composition of the present invention makes it possible to improve coloring that stems from the deterioration of the photochromic compound when it is used for extended periods of time. Any known ultraviolet ray absorbing agent can be used without limitation. Particularly preferred agent is a benzotriazole ultraviolet ray absorbing agent or a benzophenone ultraviolet ray absorbing agent. As the benzotriazole ultraviolet ray absorbing agent, there can be used any known compound having a benzotriazole skeleton and ultraviolet ray-absorbing ability without any limitation.

As the benzophenone ultraviolet ray absorbing agent, there can be used any known compound having a benzophenone skeleton and ultraviolet ray absorbing ability without any limitation. There can be preferably used, for example, the benzotriazole ultraviolet ray absorbing agents and the benzophenone ultraviolet ray absorbing agents that are described below.

Benzotriazole ultraviolet ray absorbing agents:
(1) 2-(5-Methyl-2-hydroxyphenyl)benzotriazole [trade name: Tinuvin P, produced by Nihon Chiba Geigy Co.];
(2) 2-[2-Hydroxy-3,5-bis(α,α-dimethylbenzyl)phenyl]-2H-benzotriazole [trade name: Tinuvin 234, produced by Nihon Chiba Geigy Co.];
(3) 2-(3,5-Di-t-butyl-2-hydroxyphenyl)benzotriazole [trade name: Tinuvin 320, produced by Nihon Chiba Geigy Co.];
(4) 2-(3-t-Butyl-5-methyl-2-hydroxyphenyl)-5-chlorobenzotriazole [trade name: Tinuvin 326, produced by Nihon Chiba Geigy Co.];
(5) 2-(3,5-Di-t-butyl-2-hydroxyphenyl)-5-chlorobenzotriazole [trade name: Tinuvin 327, produced by Nihon Chiba Geigy Co.];
(6) 2-(3,5-Di-t-amyl-2-hydroxyphenyl)benzotriazole [trade name: Tinuvin 328, produced by Nihon Chiba Geigy Co.]; and
(7) 2-(2'-Hydroxy-5'-t-octylphenyl)benzotriazole [trade name: Tinuvin 329, produced by Nihon Chiba Geigy Co.].

Benzophenone ultraviolet ray absorbing agents:

(1) 2-Hydroxyl-4-methoxybenzophenone [trade name: Sumisorb 110, produced by Sumitomo Kagaku Co.];
(2) 2-Hydroxyl-4-octyloxybenzophenone [trade name: Sumisorb 130, produced by Sumitomo Kagaku Co.];
(3) Bis(2-hydroxyl-4-methoxyl)benzophenone [trade name: UVINUL D-49, produced by BASF Co.];
(4) 2-Hydroxybenzophenone [trade name: UVINUL 400, produced by BASF Co.];
(5) Bis(2,4-dihydroxy)benzophenone [trade name: UVINUL D50, produced by BASF Co.];
(6) 2,4-Dihydroxybenzophenone [trade name: KEMISORB 10, produced by Chemipro Kasei Co.];
(7) 2-Hydroxyl-4-dodecyloxybenzophenone [trade name: KEMISORB 13, produced by Chemipro Kasei Co.];
(8) 4-Benzyloxy-2-hydroxybenzophenone [trade name: KEMISORB 15, produced by Chemipro Kasei Co.]; and
(9) 2,2'-Dihydroxy-4-methoxybenzophenone [trade name: KEMISORB 111, produced by Chemipro Kasei Co.].

Addition of the above-mentioned ultraviolet ray absorbing agents does not at all affect the homogeneity in the color in the transient stage of developing color, which is the feature of the photochromic composition of the present invention. Desirably, however, the ultraviolet ray absorbing agents are used in an amount of from 1 to 500 parts by weight and, more preferably, from 10 to 300 parts by weight per 100 parts by weight of the photochromic composition of the present invention. When the amount is smaller than 1 part by weight, coloring is not effectively suppressed when the composition is deteriorated. When the amount exceeds 500 parts by weight, on the other hand, the color-developing density decreases as a whole.

[Photochromic Composition and Photochromic Polymerizable Composition]

The photochromic composition of the present invention dissolves well in a general organic solvent such as toluene, chloroform or tetrahydrofuran. The photochromic composition of the present invention dissolved in such a solvent remains colorless and clear, and exhibits no initial color. When irradiated with sunlight or ultraviolet rays, the solvent quickly develops a color or a neutral tint. When light is shielded, the solvent quickly returns to its initial colorless state, which is a reversible photochromic action. The photochromic composition of the present invention exhibits similar photochromic action in a high-molecular solid matrix, too. Any high-molecular solid matrix can be used provided the photochromic compound of the present invention can be homogeneously dispersed therein. Optically preferred examples include thermoplastic resins such as poly(methyl acrylate), poly(ethyl acrylate), poly(methyl methacrylate), poly(ethyl methacrylate), polystyrene, polyacrylonitrile, polyvinyl alcohol, polyacrylamide, poly(2-hydroxyethyl methacrylate), polydimethylsiloxane and polycarbonate.

There can be further exemplified thermosetting resins obtained by polymerizing radical polymerizable polyfunctional monomers, such as ester compounds of multi-valent acrylic acid or multi-valent methacrylic acid, e.g., ethylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, ethylene glycol bisglycidyl methacrylate, bisphenol A dimethacrylate, 2,2-bis(4-methacryloyloxyethoxyphenyl)propane, and 2,2-bis(3,5-dibromo-4-methacryloyloxyethoxyphenyl)propane; multi-valent allyl compounds, e.g., diallyl phthalate, diallyl terephthalate, diallyl isophthalate, diallyl tartarate, diallyl epoxysuccinate, diallyl fumarate, diallyl chlorendate, diallyl hexaphthalate, diallyl carbonate, allyl diglycol carbonate, and trimethylolpropanetriallyl carbonate; multi-valent thioacrylic acid and multi-valent thiomethacrylic acid ester compounds, e.g., 1,2-bis(methacryloylthio)ethane, bis(2-acryloylthioethyl)ether, and 1,4-bis(methacryloylthiomethyl) benzene; acrylic acid ester compounds and methacrylic acid ester compounds, e.g., glycidyl acrylate, glycidyl methacrylate, β-methylglycidyl methacrylate, bisphenol A-monoglycidyl ether-methacrylate, 4-glycidyloxymethacrylate, 3-(glycidyl-2-oxyethoxy)-2-hydroxypropyl methacrylate, 3-(glycidyloxy-1-isopropyloxy)-2-hydroxypropyl acrylate, and 3-(glycidyloxy-2-hydroxypropyloxy)-2-hydroxypropyl acrylate; and divinyl benzene.

There can be further exemplified copolymers of these monomers with radical polymerizable monofunctional monomers such as unsaturated carboxylic acids, e.g., acrylic acid, methacrylic acid and anhydrous maleic acid; ester compounds of acrylic acid or methacrylic acid ester compounds, e.g., methyl acrylate, methyl methacrylate, benzyl methacrylate, phenyl methacrylate, 2-hydroxyethyl methacrylate and glycidyl methacrylates; fumaric acid ester compounds, e.g., diethyl fumarate and diphenyl fumarate; thioacrylic acid and thiomethacrylic acid ester compounds, e.g., methyl thioacrylate, benzylthio acrylate and benzylthio methacrylate; and vinyl compounds such as styrene, chlorostyrene, methylstyrene, vinylnaphthalene, α-methylstyrene dimer and bromostyrene.

There is no particular limitation on the method of preparing the photochromic polymerizable composition of the present invention, i.e., on the method of dispersing the photochromic composition of the present invention in the high-molecular solid matrix, and a generally employed method can be used. There can be exemplified, for example, a method in which the above-mentioned thermoplastic resin and the photochromic composition of the present invention are kneaded together in a melted state so as to be dispersed in the resin, a method in which the photochromic composition of the present invention is dissolved in the polymerizable monomer and is thermally or optically polymerized by the addition of a polymerizing catalyst so as to be dispersed in the resin, or a method in which the surfaces of the thermoplastic resin or the thermosetting resin are dyed with the photochromic compound of the present invention so as to be dispersed in the resin.

The most simple method of dispersing the photochromic composition of the present invention in the high-molecular solid matrix is the one in which the photochromic composition of the present invention and the polymerizable monomer are mixed together and dissolved, followed by the polymerization to obtain a photochromic cured product.

There is no particular limitation on the polymerizable monomer, and widely known polymerizable monomers may be used in one or more kinds being mixed together. In order to avoid a drop in the photochromic properties caused by the polymerizable groups remaining after the polymerization, however, it is desired that the polymerizable monomers are radical polymerizable monomers. As the radical polymerizable monomers, there can be exemplified polymerizable monomers having a polymerizable group such as vinyl group, allyl group, acryloyl group or methacryloyl group. In order to obtain favorable photochromic properties, however, it is desired to use a polymerizable monomer ((meth)acrylate polymerizable monomer) having an acryloyl group or methacryloyl group, and it is most desired to use a radical polymerizable monomer containing the (meth)acrylate polymerizable monomer in an amount of from 70 to 100% by weight. Concretely, there can be exemplified a polymer comprising the above-mentioned radical polymerizable polyfunctional monomers, or those same as the radical polymerizable monomers exemplified in the description of copolymers of the monomers and the radical polymerizable monofunctional monomers.

Though there is no particular limitation on the ratio of the amount of the polymerizable monomers and the photochromic composition of the present invention, it is desired that the photochromic composition of the present invention is used, usually, in an amount of from 0.001 to 10 parts by weight and, preferably, from 0.001 to 1 part by weight per 100 parts by weight of the polymerizable monomer in order to obtain a sufficient degree of color density and sufficient degree of transparency while preventing the photochromic composition of the invention from being aggregation.

More concretely, the photochromic composition is compounded into the photochromic polymerizable composition so that the amount of the fulgimide compound and/or the fulgide compound is 0.001 to 0.25 parts by weight and the amount of the chromene compound (i) is 0.0001 to 0.75 parts by weight, per 100 parts by weight of the polymerizable monomer. (In the case that the photochromic composition further comprises the chromene compound (ii) and the spirooxazine compound, the photochromic composition is compounded into the photochromic composition so that the amount of the chromene compound (ii) is 0.0001 to 0.75 parts by weight and the amount of the spirooxazine compound is 0.0001 to 0.5 parts by weight, per 100 parts by weight of the polymerizable monomer.)

The photochromic composition or the photochromic polymerizable composition of the present invention may be further admixed, as required, with various stabilizers and additives, such as antioxidant, ultraviolet ray stabilizer, dye, pigment, coloring-preventing agent, antistatic agent, fluorescent dye, etc.

There is no limitation on the polymerization method, and a known curing method can be employed. The polymerization means can be put into practice by using radical polymerization initiators such as peroxides and azo compounds, or by the use thereof in combination with the irradiation of ultraviolet rays, α-rays, β-rays or γ-rays. According to a representative polymerization method, an injection polymerization is employed according to which a polymerizable composition comprising a radical polymerization initiator, a photochromic composition of the present invention and a polymerizable monomer is injected into a mold held by elastomer gaskets or spacers, and is polymerized in a heating furnace and is, then, taken out.

A known radical polymerization initiator can be used without limitation. Representative examples include diallyl peroxides such as benzoyl peroxide, p-chlorobenzoyl peroxide, decanoyl peroxide, lauroyl peroxide and acetyl peroxide; peroxy esters such as t-butylperoxy-2-ethyl hexanate, t-butyl peroxyneodecanate, cumyl peroxyneodecanate, t-butyl peroxybenzoate, t-butyl peroxyisobutylate, and 1,1,3,3-tetramethylbutylperoxy-2-ethyl hexanate; percarbonates such as diisopropylperoxycarbonate, di-sec-butylperoxydicarbonate; and azo compounds such azobisisobutylonitrile, etc. Among them, it is desired to use the t-butylperoxyneodecanate, t-butylperoxyneodecanate/t-butylperoxyisobutylate, t-butylperoxyneodecanate/1,1,3,3-tetramethylbutylperoxy-2-ethylhexanate in combination from the standpoint of polymerization efficiency and hardness of the cured product.

The photochromic composition of the present invention can be used over a wide range as a photochromic material.

For example, it can be used as various memory materials to substitute for a silver salt photosensitive material, i.e., used as a copying material, a photosensitive material for printing, a memory material for cathode-ray tubes, a photosensitive material for laser, a photosensitive material for holography, etc. Furthermore, the photochromic material using the photochromic composition of the present invention can be utilized as a material for photochromic lenses, as a material for optical filters, as a display material, as a material for actinometers and as a material for ornamental use. When used for a photochromic lens, for example, any method can be used without limitation provided it makes it possible to obtain a uniform dimming performance. Concretely speaking, there can be employed a method in which a polymer film containing the photochromic composition of the present invention homogeneously dispersed therein is sandwiched in the lens, a method in which the photochromic composition of the present invention is dispersed in the polymerizable monomer and is polymerized according to a predetermined method, or a method in which the composition is dissolved in, for example, a silicone oil, and the surfaces of the lens are impregnated with the composition at 150 to 200° C. for 10 to 60 minutes and are coated with a curing substance thereby to obtain a photochromic lens. There can be further employed a method in which the polymer film is applied onto the surfaces of the lens, and the surfaces are coated with a curing substance to obtain a photochromic lens.

The photochromic composition of the present invention develops a neutral tint such as green, grey or brown maintaining a favorable homogeneity in the color in the transient stage of developing color owing to the use of a fulgimide compound and a particular chromene compound. The photochromic lens using the photochromic composition of the present invention quickly develops a neutral tint such as green, grey or brown when a person goes out of doors bringing it with him, and further develops a deepened color maintaining the same color tone.

EXAMPLES

The invention will be described in further detail by way of Examples to which only, however, the invention is in no way limited. In Examples, "parts" means parts by weight. Described below are abbreviated symbols of the compounds used in Examples and in Comparative Examples hereinbelow.

1. Chromene compounds having molar extinction coefficients of not smaller than 150 L/mol-cm at a wavelength of 400 nm (chromene 1).

C-1:

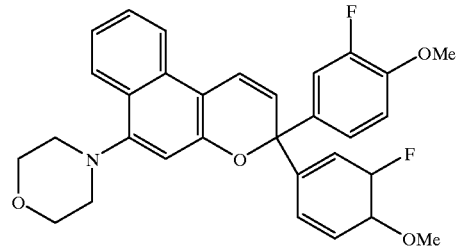

C-2:
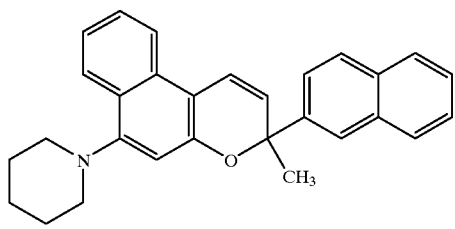
C-3:
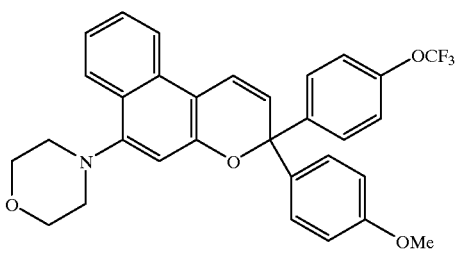
C-4:
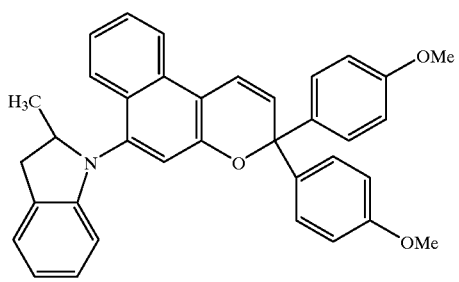
C-5:
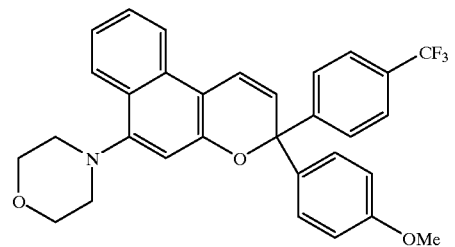
2. Chromene compounds having molar extinction coefficients of smaller than 150 L/mol-cm at a wavelength of 400 nm (chromene 2).
C'-1:
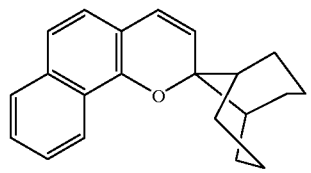
C'-2:
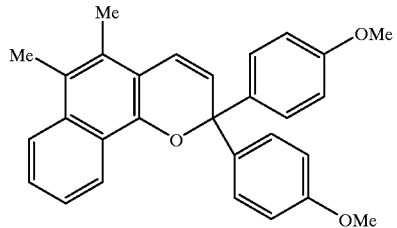
C'-3:
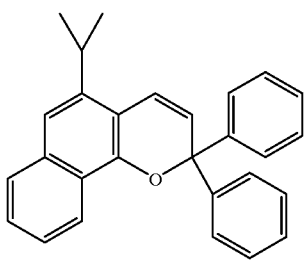
C'-4:
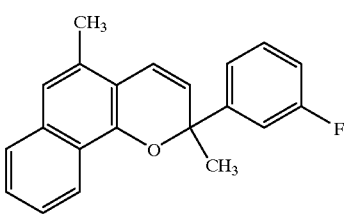
C'-5:
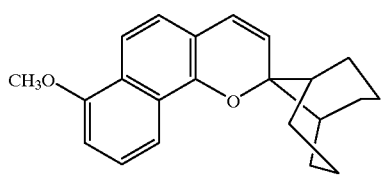
3. Fulgimide
F-1:
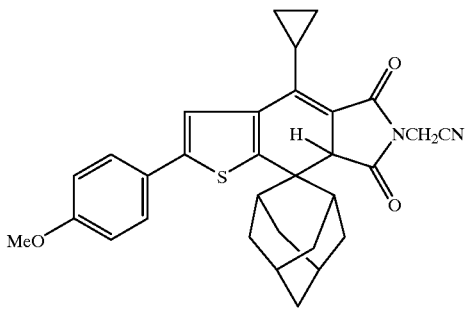
F-2:
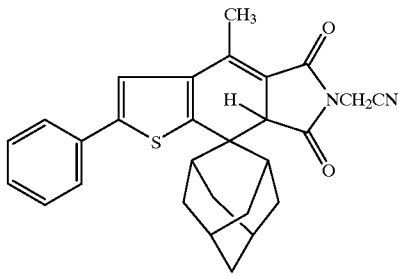

F-3:
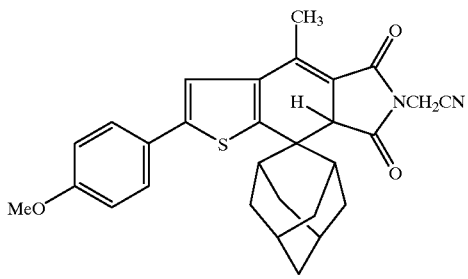

F-4:
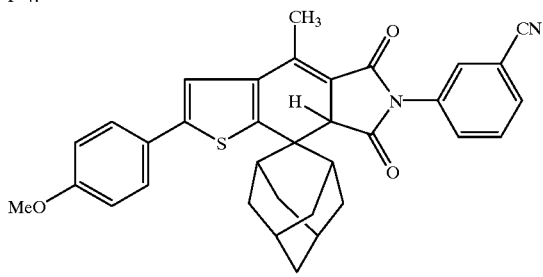

F-5:
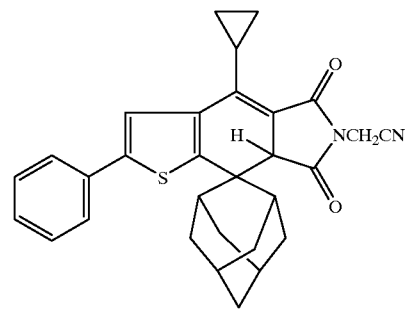

F-6:
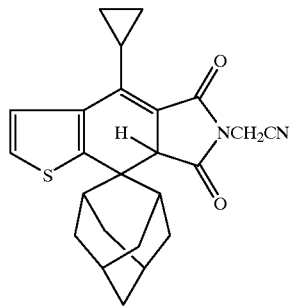

4. Spirooxazine

SP-1:
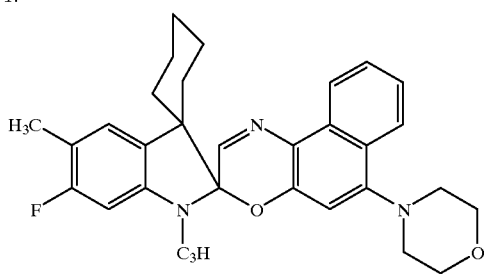

SP-2:
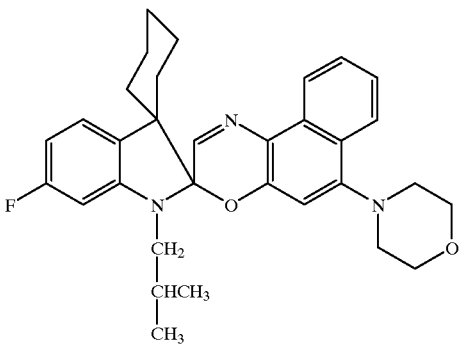

SP-3:
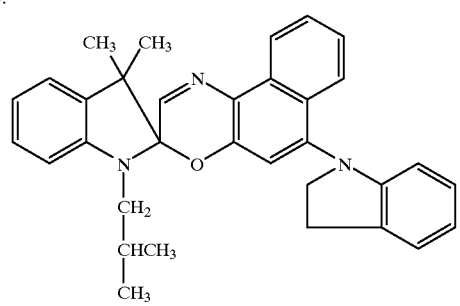

5. Radical polymerizable monomers.
  3G: Triethylene glycol dimethacrylate (trade name: NK Ester 3G, produced by Shin-Nakamura Kagaku Co.)
  BPE-100N: 2,2-Bis(4-methacryloyloxyethoxyphenyl)propane (trade name: NK Ester BPE-100, produced by Shin-Nakamura Kagaku Co.)
  MS: α-Methylstyrene
  MSD: α-Methylstyrene dimer
  GMA: Glycidyl dimethacrylate
6. Radical polymerization initiators. Perbutyl ND: t-Butylperoxyneodecanate (trade name: Perbutyl ND, produced by Nihon Yushi Co.)
  Perocta O: 1,1,3,3-Tetramethylbutylperoxy-2-ethyl hexanate (trade name: Perocta 0, produced by Nihon Yushi Co.)
7. Ultraviolet ray absorbing agents.
  UVA-1: 2-(5-Methyl-2-hydroxyphenyl)benzotriazole (trade name: Tinuvin P, produced by Nihon Chiba Geigy Co.)
  UVA-2: 2-Hydroxyl-4-methoxybenzophenone (trade name: Sumisorb 110, produced by Sumitomo Kagaku Co.)

Example 1

100 Parts by weight of polymerizable monomers comprising 48 parts of BPE-100N, 35 parts of 3G, 8 parts of GMA, 8 parts of MS and 1 part of MSD, was admixed with 0.025 parts by weight of the chromene compound C-1, 0.05 parts by weight of the fulgimide compound F-1 as photochromic compounds, 0.5 parts by weight of the perbutyl ND and 0.4 parts by weight of the Perocta O as polymerization initiators, and the mixture was mixed well. The mixture solution was poured into a mold constituted by a glass plate and a gasket made of an ethylene-vinyl acetate copolymer, to carry out the cast polymerization. The polymerization was conducted by using an air furnace while gradually raising the temperature to 30° C. through up to 90° C. over 18 hours, and the temperature of 90° C. was maintained for 2 hours. After the polymerization, the obtained polymer was taken out of the mold.

The obtained polymer (2 mm thick) was allowed to develop color outdoors. The tone of the developed color was observed by eyes 0.5 minutes and 15 minutes after the polymer was brought to outdoors to evaluate the homogeneity in the color during the transient stage of developing color.

Table 1 shows the tone of developed color of the obtained polymer 0.5 minutes and 15 minutes after it is brought to outdoors. There was a difference in the color density of the polymer depending upon whether 0.5 minutes have passed or 15 minutes have passed, but the same tone of green color was maintained.

Table 2 shows the molar extinction coefficient of the chromene compound for light of a wavelength of 400 nm. The molar extinction coefficient was calculated by measuring the absorbance of the chromene compound in the form of an acetonitrile solution of $1 \times 10^{-5}$ mol/L at the wavelength of 400 nm by using a self-recording spectrophotometer U-3210 manufactured by Hitachi, Ltd.

FIG. 1 shows ultraviolet—visible spectra of the chromene compounds C-1 and C'-1 at wavelengths of from 300 to 500 nm.

TABLE 2-continued

| Molar extinction coefficient (L/mol – cm) | |
|---|---|
| Chromene 2 No. | |
| C'-1 | 0 |
| C'-2 | 0 |

Examples 2 to 12

The procedure was carried out in the same manner as in Example 1 but changing the composition of the photochromic compounds as shown in Table 1. The results were as shown in Table 1.

Examples 13 to 18

The procedure was carried out in the same manner as in Example 1 but changing the composition of the photochromic compounds as shown in Table 3. The results were as shown in Table 3.

Comparative Examples 1 to 3

The procedure was carried out in the same manner as in Example 1 but replacing the chromene compound used in Example 1 by those shown in Table 1. The results were as shown in Table 1.

TABLE 1

| | Chromene 1 | | Chromene 2 | | Fulgimide | | UV absorber | | Color tone | |
| | | | | | | | | | After | After |
| | No. | (pts.) | No. | (pts.) | No. | (pts.) | No. | (pts.) | 0.5 min. | 15 min. |
|---|---|---|---|---|---|---|---|---|---|---|
| Ex. No. | | | | | | | | | | |
| 1 | C-1 | 0.025 | | | F-1 | 0.05 | | | green | green |
| 2 | C-1 | 0.04 | | | F-3 | 0.07 | | | grey | grey |
| 3 | C-1 | 0.06 | | | F-2/F-3 | 0.03/0.03 | | | brown | brown |
| 4 | C-1 | 0.025 | | | F-4 | 0.05 | | | grey | grey |
| 5 | C-1 | 0.05 | | | F-5 | 0.10 | | | grey | grey |
| 6 | C-2 | 0.05 | | | F-6 | 0.10 | | | grey | grey |
| 7 | C-2/C-4 | 0.02/0.01 | | | F-1 | 0.05 | | | grey | grey |
| 8 | C-4 | 0.06 | | | F-1 | 0.03 | | | brown | brown |
| 9 | C-3 | 0.04 | | | F-3 | 0.07 | | | grey | grey |
| 10 | C-5 | 0.025 | | | F-1 | 0.05 | | | green | green |
| 11 | C-1 | 0.025 | | | F-1 | 0.05 | UVA-1 | 0.01 | grey | grey |
| 12 | C-1 | 0.04 | | | F-3 | 0.07 | UVA-2 | 0.05 | grey | grey |
| Comp. Ex. No. | | | | | | | | | | |
| 1 | | | C'-1 | 0.025 | F-1 | 0.05 | | | blue | grey |
| 2 | | | C'-1 | 0.025 | F-3 | 0.07 | | | blue | grey |
| 3 | | | C'-2 | 0.05 | F-1 | 0.03 | | | blue | brown |

TABLE 2

| Molar extinction coefficient (L/mol – cm) | |
|---|---|
| Chromene 1 No. | |
| C-1 | 330 |
| C-2 | 550 |
| C-3 | 390 |
| C-4 | 1100 |
| C-5 | 230 |

In all Comparative Examples 1 to 3, the color tone after 0.5 minutes was blue that was due to the fulgimide compound but after 15 minutes, the color tone was a neutral tint of grey or brown. It will thus be understood that when the photochromic composition of the present invention is not used, homogeneity in the color is lost during the transient stage of developing color.

TABLE 3

| | Chromene 1 | | Chromene 2 | | Fulgimide | | Spirooxazine | | Color tone | |
|---|---|---|---|---|---|---|---|---|---|---|
| | | | | | | | | | After | After |
| Ex. No. | No. | (pts.) | No. | (pts.) | No. | (pts.) | No. | (pts.) | 0.5 min. | 15 min. |
| 13 | C-1 | 0.025 | C'-3 | 0.025 | F-1 | 0.045 | SP-1 | 0.05 | grey | grey |
| 14 | C-1 | 0.025 | C'-3/C'-5 | 0.045/0.01 | F-1 | 0.015 | SP-1 | 0.015 | brown | brown |
| 15 | C-1 | 0.025 | C'-4/C'-5 | 0.06/0.01 | F-1 | 0.05 | SP-1 | 0.05 | grey | grey |
| 16 | C-2 | 0.05 | C'-1/C'-3 | 0.01/0.02 | F-2 | 0.03 | SP-2 | 0.015 | brown | brown |
| 17 | C-2/C-4 | 0.02/0.01 | C'-2/C'-3 | 0.01/0.02 | F-3 | 0.03 | SP-3 | 0.015 | brown | brown |
| 18 | C-1 | 0.025 | C'-3/C'-4 | 0.01/0.06 | F-1 | 0.05 | SP-1 | 0.05 | grey | grey |

What is claimed is:

1. A photochromic composition comprising 100 parts by weight of a fulgimide compound and/or a fulgide compound, and from 10 to 300 parts by weight of a chromene compound having a molar extinction coefficient of not smaller than 150 L/mol-cm for light of a wavelength of 400 nm.

2. A photochromic composition according to claim 1, further containing a spirooxazine compound and/or a chromene compound having a molar extinction coefficient of smaller than 150 L/mol-cm for light of a wavelength of 400 nm.

3. A photochromic composition according to claim 1, further containing an ultraviolet ray-absorbing agent.

4. A photochromic composition according to claim 1, wherein the chromene compound is represented by the following general formula (1),

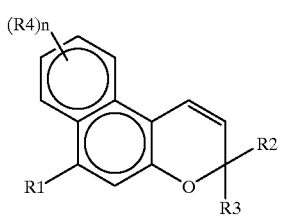

(1)

wherein R1 is a group represented by the following formula (2),

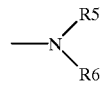

(2)

wherein R5 and R6 may be different from each other and are hydrogen atoms, substituted or unsubstituted alkyl groups having 1 to 10 carbon atoms, substituted or unsubstituted aromatic hydrocarbon groups having 6 to 10 carbon atoms, or heterocyclic groups, a substituted or unsubstituted heterocyclic group having at least nitrogen atom as a hetero atom, the nitrogen atom being bonded to a naphthopyran ring, or a condensed heterocyclic group in which the heterocyclic group is condensed with an aromatic hydrocarbon ring or an aromatic heterocyclic ring, R2 and R3 may be different from each other and are substituted unsubstituted aromatic hydrocarbon groups, or substituted or unsubstituted aromatic heterocyclic groups or alkyl groups, R4 is a substituent, n is an integer of from 0 to 4 representing the number of R4, and, when n is not smaller than 2, R4 may be the same or different groups.

5. A photochromic composition according to claim 1, wherein the chromene compound is represented by the following general formula (1'),

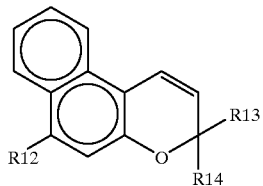

(1')

wherein R12 is a group represented by the following formula (2'),

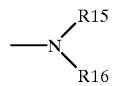

(2')

wherein R15 and R16 may be different from each other and are substituted or unsubstituted alkyl groups having from 1 to 10 carbon atoms,
or is a substituted or unsubstituted group selected from the group consisting of pyrrolydinyl group, morpholino group, piperidino group, thiomorpholino group, aziridinyl group, piperadinyl group, hexamethyleneimino group, indolyl group and tetrahydroquinolyl group, and R13 and R14 may be different from each other and are methyl groups or substituted or unsubstituted groups selected from the group consisting of phenyl group, naphthyl group, furyl group, thienyl group, pyrrolyl group, benzofuryl group and benzothienyl group.

6. A photochromic composition according to claim 1, wherein said fulgimide compound and/or said fulgide compound has a molar extinction coefficient of not smaller than 100 L/mol-cm for light of a wavelength of 380 nm.

7. A photochromic polymerizable composition containing the photochromic composition of claim 1 in an amount of from 0.001 to 1 part by weight and a radically polymerizable monomer in an amount of 100 parts by weight.

8. A photochromic polymerizable composition according to claim 7, wherein the radically polymerizable monomer contains a (meth)acrylate polymerizable monomer in an amount of from 70 to 100% by weight.

9. A photochromic cured product obtained by polymerizing the photochromic polymerizable composition of claim 7.

10. A photochromic lens comprising the photochromic cured product of claim 9.

* * * * *